United States Patent Office 3,172,878
Patented Mar. 9, 1965

3,172,878
SUSPENSION POLYMERIZATION PROCESS USING ADDITIVE MIXTURES OF POLYACRYLAMIDE AND NATURAL GUMS
Nicholas Chomitz, Yonkers, N.Y., assignor to American Cyanamid Company, New York, N.Y., a corporation of Maine
No Drawing. Filed Jan. 31, 1962, Ser. No. 170,227
10 Claims. (Cl. 260—88.2)

The present invention relates to ethenoid monomer polymerization. More particularly, it relates to a process for polymerizing unsaturated organic compounds in an aqueous suspending medium. Still more particularly, the invention is concerned with the suspension polymerization of ethenoid monomers, whereby polymeric products are obtained in the form of uniform, discrete, substantially spherical, granular pearls or prills.

Heretofore, both emulsion and suspension techniques have been employed in converting ethenoid monomers to the corresponding polymeric form. However, neither technique has been wholly successful in preparing uniform prills of polymerized ethenoid compounds, particularly useful as propping beads in oil recovery processes. Emulsion polymerization of ethenoid monomers for these purposes is substantially valueless. Suspension polymerization techniques, however, have been extensively employed in preparing granular or globular particles. In order to achieve any degree of success in occasionally obtaining uniform granular particles, it became necessary to incorporate additives into the suspending medium prior to effecting polymerization of the monomer. For instance, gum tragacanth, methyl cellulose, sodium polyacrylate and hydrous magnesium silicate, as illustrative additives, have individually been incorporated in suspending media. Notwithstanding such provisions, difficulties have been experienced. Coagulated lumps or aggregates of polymeric materials, rather than discrete, uniform pearls or prills, have unfortunately been frequently obtained. Such aggregates of ethenoid polymers cannot be tolerated for many uses. One such is as propping beads in the oil-well production industry. Discrete, uniform prills are required. If a process for obtaining discrete, uniform, substantially spherical prills could be provided, a long-felt need in the art would indeed be satisfied.

It is, therefore, a principal object of the present invention to provide an economical process for obtaining ethenoid polymeric prills in uniform and discrete form. It is a still further object to provide a process for effecting the substantially consistent preparation of polymers free from agglomerates. Other objects will become apparent to those skilled in the art upon a consideration of the following detailed description.

To this end, it has been unexpectedly found that discrete, uniform prills of ethenoid polymers can be obtained from monomers in a straightforward manner by providing a novel additive mixture to a suspending medium prior to polymerization of the ethenoid monomer. In so-proceeding, agglomerates are not formed. Specifically, it has been found that an additive mixture of certain natural gums and polyacrylamide in relatively small amounts surprisingly affects polymerization of ethenoid monomers in uniform, discrete prill form, rather than as coagulated or agglomerated masses.

According to the process of the present invention, certain natural gums and polyacrylamide are added either individually or as a mixture to an agitated suspending medium. Monomeric ethenoid materials are then introduced through a nozzle-like orifice, or a plurality of the latter. Initially, gelation of the monomer occurs in the form of prills. The gelled prills are then permitted to polymerizes completely in the suspension solution and, thereafter, are removed therefrom. Removed prills are next washed with water, oven-cured and then cooled to room temperature.

In general, the natural gum component of the additive useful in the process of the invention is either gum arabic or gum ghatti or mixtures of the same. Polyacrylamide is the other component of the additive and possesses a molecular weight between two and five million. It is added to the suspending medium along with the natural gum component. Although the relative amounts of each component of the additive mixture are not critical with respect to the suspending medium, it is found that a good practice is to employ (a) from about 0.01% to about 0.5%, and preferably from 0.07% to 0.2% of the natural gum and (b) from about 0.001% to about 1%, and preferably from 0.01% to 0.05% of polyacrylamide, based upon the weight of the suspending medium.

Advantageously, water alone may be used as the suspending medium. However, a variety of liquids compatible with water and substantially inert to the monomeric compounds to be polymerized may be incorporated into the water. For instance, liquids such as propylene glycol, ethylene glycol or butylene glycol may replace a minor portion of the suspending medium. It has been found that approximately up to 25% of the liquid may advantageously replace water.

The ethenoid polymers prepared in accordance with the instant invention are derived from at least one monomer which is substantially insoluble either in water or in a water environment and which contains in its structural configuration at least one —CH=CH— group. Illustratiive ethenoid polymers are: polystyrene, polyvinyl chloride, polyvinyl esters, such as polyvinyl acetate, and especially those polymers formed by copolymerization of the latter corresponding monomers with minor amounts of polyvinylated benzene, such as divinyl benzene; polymeric esters of acrylic acid and α-substituted acrylic acids, such as ethyl acrylate, methyl methacrylate and equivalents thereof. A preferred ethenoid polymer is one obtained by copolymerizing a catalyzed mixture comprising a major amount of styrene, usually from about 95% to 85%, and a minor amount of divinyl benzene, usually from about 5% to 15%, and in the presence of a catalyst from about 0.10% to about 2% usually in the form of benzoyl peroxide.

It has been found that the suspension solution can be maintained at any desired pressure. Thus, subatmospheric, atmospheric or superatmospheric pressure can be employed. However, for ease of operation, atmospheric pressure is preferred.

Advantageously, the temperature of polymerization is not critical and can be varied widely depending on the particular monomer undergoing polymerization. Since polymerization proceeds more rapidly at elevated temperatures, it is desirable that the suspending solution containing the additive mixture be at least warmed and, preferably, heated. However, the upper limit should be set approximately 5° C. below the boiling point of the suspending solution at any operative pressure. It is a good practice to employ temperatures between about 75° C. and 95° C.

In general, for best operation, it has been found that for most monomers a gelation time from about fifteen minutes to about one hour is sufficient. Further, an additional two to about three hours are found adequate to finalize polymerization.

In order to facilitate a further understanding of the invention, the following examples are given primarily for

Example 1

Into a 200 gallon glass-lined, jacketed polymerization kettle, equipped with an agitator and an inlet for monomer, said inlet being a bead-forming device comprising thirty-six hypodermic needles of 20 gauge, each set in a lead gasket and clamped between Pyrex glass fittings, is added a mixture of 60 gallons of water containing four pounds of polyacrylamide having a molecular weight of three million. The mixture is slowly agitated and to the agitated mixture are added 30 gallons of water to which 15 pounds of gum arabic have been previously added. The over-all mixture is agitated while adding 160 pounds of styrene and 20.6 pounds of commercial divinyl benzene together with 0.72 pound of benzoyl peroxide.

The latter mixture is introduced into the slowly agitated suspending medium through a bead-forming device comprising a battery of hypodermic needles. Within one-half hour, the beads gel and two and one-half hours later the beads are found to be substantially polymerized thereby falling to the bottom of the polymerization kettle. So-formed beads are easily removed through an opening provided in the bottom of the kettle, washed with water and oven-cured for approximately nine hours at 250° F. Uniform and discrete prills of cross-linked polystyrene of from 8 to 20 screen mesh are obtained.

Example 2

The procedure of Example 1 above is repeated in every detail, except that the gum arabic is omitted from the suspending medium. Aggregates, rather than discrete, uniform prills of copolymer of styrene and divinyl benzene are obtained.

Example 3

Repeating the procedure of Example 1, except that polyacrylamide is omitted from the suspending medium, it is found that lumps of polystyrene polymer are obtained.

Example 4

Repeating the process of Example 1, except that gum ghatti is substituted in lieu of gum arabic, discrete, uniform prills from 8 to 20 mesh are obtained.

Example 5

A monomeric mixture comprising commercial methyl styrene and commercial divinyl benzene is utilized as the monomeric mixture in the procedure of Example 1. Discrete, uniform prills of corresponding cross-linked polymer are obtained.

Example 6

In lieu of the monomeric mixture of Example 1, ethyl acrylate is substituted and the procedure repeated. Discrete and uniform prills of polyethyl acrylate are obtained.

It is an advantage of the present invention that the process can be carried out continuously as well as batchwise. The former is a preferred embodiment of the invention, for the reason that uniformity of prill size is insured. The following example will illustrate suspension polymerization in a continuous manner.

Example 7

Monomer mixture of Example 1 is fed through a battery of nozzles located in the lower end of a feed conveying column measuring fifteen feet in length and containing the suspending medium of Example 1. Beads are generated therein while maintaining the temperature of the conveying column at about 75° C. by external heating. At the terminal or far end of the feed conveying column, a 45° collar is placed on that column which is vertically positioned. A five foot section of a pipe is attached to the collar. Directly linked to the opposite end thereof is a second reaction or polymerization kettle. This kettle is similarly charged with suspending medium and is slowly agitated.

As the beads rise in the feed conveying column, they gel and overflow into the polymerization kettle. Polymerization is finalized therein. At the end of about two and one-half hours, the beads increase in density and fall to the bottom of the polymerization kettle. A pipe is provided in the bottom of the polymerization kettle through which both suspending medium and beads or prills are continuously discharged into a collection vessel. The prills are collected at the bottom of the latter vessel and the suspending medium is withdrawn as an overflow and recycled to the feed conveying column into which monomer is continuously introduced. Recovered polymeric beads or prills are free from agglomerates. They are granular, uniform, discrete and substantially spherical.

Example 8

Following the procedure of Example 7 in every detail, except that gum arabic is eliminated, the beads readily agglomerate and form a mass of gelled polymer in the feed conveying column which cannot be recovered as discrete, uniform prills as a polymerized product.

The omission of polyacrylamide similarly causes agglomeration to occur.

I claim:

1. In a process for the aqueous suspension polymerization of at least one monomeric water-insoluble ethenoid material containing in said material one —CH=CH— group in its molecular configuration, the improvement which comprises the steps of: adding said monomer to a suspension solution containing a suitable polymerization catalyst and a mixture comprising polyacrylamide having a molecular weight between about 2 million and about 5 million and a natural gum selected from the group consisting of gum arabic and gum ghatti, said polyacrylamide being present in an amount from about 0.001% to about 1%, and the natural gum being present to the extent of 0.01% to 0.5%, based on the said suspension solution, and thereafter recovering polymer free from agglomerates.

2. The process according to claim 1, in which the ethenoid material is a mixture of a major amount of styrene and a minor amount of divinyl benzene.

3. The process according to claim 1, in which the ethenoid material is styrene.

4. The process according to claim 1, in which the ethenoid material is ethyl acrylate.

5. The process according to claim 1, in which the natural gum is gum arabic.

6. The process according to claim 1, in which the natural gum is gum ghatti.

7. In a process for continuously polymerizing at least one ethenoid, water-insoluble monomer containing in said monomer one —CH=CH— group in an aqueous suspending medium, the improvement which comprises the steps of: injecting said monomer into a zone containing a suitable polymer catalyst and an aqueous suspension solution comprising water and a mixture consisting of polyacrylamide and a natural gum selected from the group consisting of gum arabic and gum ghatti, said polyacrylamide being present in an amount from about 0.001% to about 1% and the natural gum being present in an amount from about 0.01% to 0.5%, based on the weight of the system solution whereby prills are formed, maintaining the temperature of said zone at between about 75° C. and 95° C. until gelation of said monomer occurs, withdrawing the gelled prills into a second zone containing the same suspending medium present in the aforementioned first zone maintained at a temperature between about 75° C. and 95° C. thereby causing the gelled prills to densify, withdrawing both densified prills and suspending solution containing said prills into a third zone, removing dense, uniform, granular, discrete and substantially spherical polymeric prills from the bottom portion of said third zone, and continuously recycling the suspending solution to the first zone.

8. The process according to claim 7, wherein the natural gum in the suspending solution is gum arabic.

9. The process according to claim 7, wherein the natural gum in the suspending solution is gum ghatti.

10. The process according to claim 7, wherein the ethenoid monomer to be polymerized comprises a mixture of a major amount of styrene and a minor amount of divinyl benzene, whereby cross-linked polystyrene prills free from agglomerates are recovered.

References Cited by the Examiner
UNITED STATES PATENTS

| | | | |
|---|---|---|---|
| 2,388,600 | 11/45 | Collins | 260—92.8 |
| 2,473,929 | 6/49 | Wilson | 260—92.8 |
| 2,712,536 | 7/55 | Winslow | 260—89.5 |
| 2,857,367 | 10/58 | Kearning | 260—17.4 |
| 2,857,368 | 10/58 | Ingraham et al. | 260—92.8 |
| 2,932,629 | 4/60 | Wiley | 260—89.5 |
| 2,979,492 | 4/61 | Governale et al. | 260—92.8 |

JOSEPH L. SCHOFER, *Primary Examiner.*

LOUISE P. QUAST, DONALD E. CZAJA, *Examiners.*